| | | | | | | |
|---|---|---|---|---|---|---|
| •1 •2 | | U6 | U5 | OFF | OFF | |
| •1 •2 | | U6 | E5 | ON | ON | RELEASED |
| •1 •2 | | E6 | E5 | ON | ON | HELD |
| •1 •2 | | E6 | U5 | ON | ON | HELD |
| •1 •2 | | U6 | U5 | ON | ON | HELD |
| •1 •2 | | E6 | U5 | ON | ON | HELD |
| •1 •2 | | E6 | E5 | ON | ON | LATCHED |
| •1 •2 | | U6 | E5 | OFF | ON | |
| •1 •2 | | U6 | U5 | OFF | OFF | |

FIG. 3.

MODES OF RELAYS 5 & 6

WHEN RELAY IS ENERGISED (E).

WHEN PROBE NOT ON LINE RELAY IS UNENERGISED (U)

DESIRABLE POWER CONDITION.

ACTUAL POWER CONDITION FROM CIRCUIT GIVEN.

Dec. 12, 1961   C. COOGAN   3,012,730
PROGRAM CONTROLLERS OR THE LIKE
Filed Oct. 8, 1958   4 Sheets-Sheet 4

MODES OF RELAYS 5 & 6

WHEN RELAY IS ENERGISED (E)

WHEN PROBE NOT ON LINE
RELAY IS UNENERGISED (U).

United States Patent Office 3,012,730
Patented Dec. 12, 1961

3,012,730
PROGRAM CONTROLLERS OR THE LIKE
Clive Coogan, East Melbourne, Victoria, Australia, assignor to Commonwealth Scientific and Industrial Research Organization, Victoria, Australia, a body corporate
Filed Oct. 8, 1958, Ser. No. 766,645
Claims priority, application Australia Oct. 8, 1957
5 Claims. (Cl. 236—46)

This invention relates to program controllers or the like of the curve following type.

A known program controller of the above type comprises a guide line drawn on a chart, said line representing two elements of the desired program, for example time and temperaturs, and a sensing device, which is adapted to follow the contour of the curve and provides means for detecting the presence or absence of the line. Two types of such a sensing device have been described.

In the first type, two small probes are set at a spacing narrower than the line width and when both probes rest on the guide line, the response of an electrical circuit depends on the electrical conductivity of the line. When one or both probes are off the line, the response of the electrical circuit changes, and this change actuates mechanism which returns the probes to the line.

The second type of sensing device includes a single probe passing over the upper surface of the chart and a metallic backing plate situated underneath the chart and upon which the chart rests. The electrical capacity between the probe and the backing plate varies according to the presence or absence of the guide line in the path between the probe and plate. The capacity change occurring when the probe is off the line actuates mechanism which tends to draw the probe back on to the line.

Curve following apparatus according to the aforementioned specification however has a limitation in that the control acts in one direction (hereinafter referred to as the "downward" direction) only. Thus if the sensing device is above the line, the control will draw it back on to the line, but if due to some catastrophic occurrence the sensing device drops below the line, the control will act as if it were above the line and draw the sensing device in a downward direction further below the line.

Some of the catastrophic occurrences which may cause this condition are:

(a) Violent mechanical shock to the recorder-programmer. In such circumstances, after a transient displacement, the sensing head would return to a position very close to its original position.

(b) Electrical transients acting on the recorder. Under these conditions, the same considerations obtain as in (a) above.

(c) Violent hunting in the controlled variable causing the sensing device to pass through the line.

(d) Temporary cessation of the fuel or power available to a furnace, if the programmer is applied to a furnace. Analogous conditions may exist in other controlled media.

(e) Inability of the controlled variable to follow the program. This condition arises in furnace control when the furnace is required by the guiding line to heat at a rate greater than is possible with the power which is supplied. In such circumstances the sensing device may fall through the line.

In addition to the above, a gap in the line may cause the sensing device to pass below the line.

Many of the above-mentioned difficulties could be overcome by increasing the width of the guide line in a direction below its upper edge. This could be done by painting the chart with a wash of colloidal graphite or pencil graphite. However this practice would be tedious and because of this, undesirable.

It is accordingly the primary object of the present invention to provide means applicable to both capacity sensitive probe systems and conductivity sensitive probe systems whereby, if the sensing device moves away from the guide line in any direction, it may be returned on to the line.

According to the presently preferred form of the invention, a device of the type referred to comprises a line drawn on a chart representing two elements of the desired program, first means, the position of which is controlled by one element of the program, to detect the presence or absence of the line, second means the condition of which is varied according to the presence or absence of the line relatively to said first means, to vary said one element of the program in order to return the said first means to the line from a position on one side of the line, and third means operable to vary said one element of the program in order to return the first said means to the line from a position on the other side of the line.

This invention also includes a device of the type referred to which comprises a line drawn on a chart representing two elements of the desired program, a sensing mechanism, the position of which is controlled by one element of the program, and which normally follows the line or is displaced to one side thereof, and means operable in such a manner that, if the sensing mechanism should pass through the line to the other side thereof, the said one element of the program will be varied in order to return the sensing mechanism to the line.

In one application of the invention to process or program control of a medium where passing of the sensing mechanism through the line from its normal position requires the continued application of energy to the controlled medium, or to means controlling the controlled medium, in order to return the sensing mechanism to the line, the said means operable to vary the said one element of the program may comprise a latching or holding device which operates to maintain the supply of energy to the controlled medium, or to means controlling the controlled medium, until the sensing mechanism has returned to the line. The invention also comprehends the reverse position where passing of the sensing mechanism through the line from its normal position requires the absence of energy supplied to the controlled medium, or to means controlling the controlled medium, in order to return the sensing mechanism to the line. In this case the said means may comprise a latching or holding device which operates to withhold energy from the controlled medium, or from means controlling the controlled medium, until the sensing mechanism has returned to the line.

In one form of the invention, the sensing mechanism comprises two pairs of probes which pairs may pass either singly or jointly on to the line to provide a conductive bridge which actuates one or more relays or equivalent devices in accordance with the position of the probes in relation to the line, one of the said relays or equivalent devices being adapted to switch an energising source into or out of circuit to supply energy to, or cut off energy from, the controlled medium or to or from means controlling the controlled medium, and there being also provided a further relay or equivalent device controlled by any of the aforementioned relays or equivalent devices to maintain or discontinue the supply of energy to the controlled medium, or to means controlling the controlled medium, until the sensing mechanism returns to a position adjacent one edge of the line. It is also within the scope of the invention to reduce the number of probes to three by combining two of the probes into one probe which is common to the other two probes.

In a further form of the invention, the sensing mechanism comprises a pair of probes each of which forms one plate of a pair of capacitors, the other plate of each capacitor being formed from a single metallic conductive surface underneath the chart. The dielectric of each capacitor is varied according to the position of the line in relation to the corresponding probe and each capacitor is connected in circuit with a separate relay or equivalent device. The relays or equivalent devices are thus actuated in accordance with the position of each probe with respect to the line, one of said relays or equivalent devices being adapted to switch an energising source into or out of circuit to supply energy to, or cut off energy from, the controlled medium or to or from means controlling the controlled medium, and there being also provided a further relay or equivalent device controlled by any of the aforementioned relays or equivalent devices to maintain or discontinue the supply of energy to the controlled medium or to means controlling the controlled medium until the sensing mechanism returns to a position adjacent one edge of the line.

In the ensuing description the term "double conductive sensitive probe system" denotes a system according to the invention utilising the conductivity of the line, while the term "double capacity probe system" denotes a system according to the invention utilising the capacity variation between a probe and a conducting plate underneath the chart due to the dielectric properties of the line.

Having described the general objects and nature of this invention, one of the practical applications thereof will now be described with reference to the accompanying drawings which illustrate two methods in which the invention is utilised in controlling the heating program of a furnace.

In the drawings:

FIGURES 3 and 4 illustrate the principle of the invention, with specific reference to the double capacity type probe system of FIGURE 1.

Figure 1:
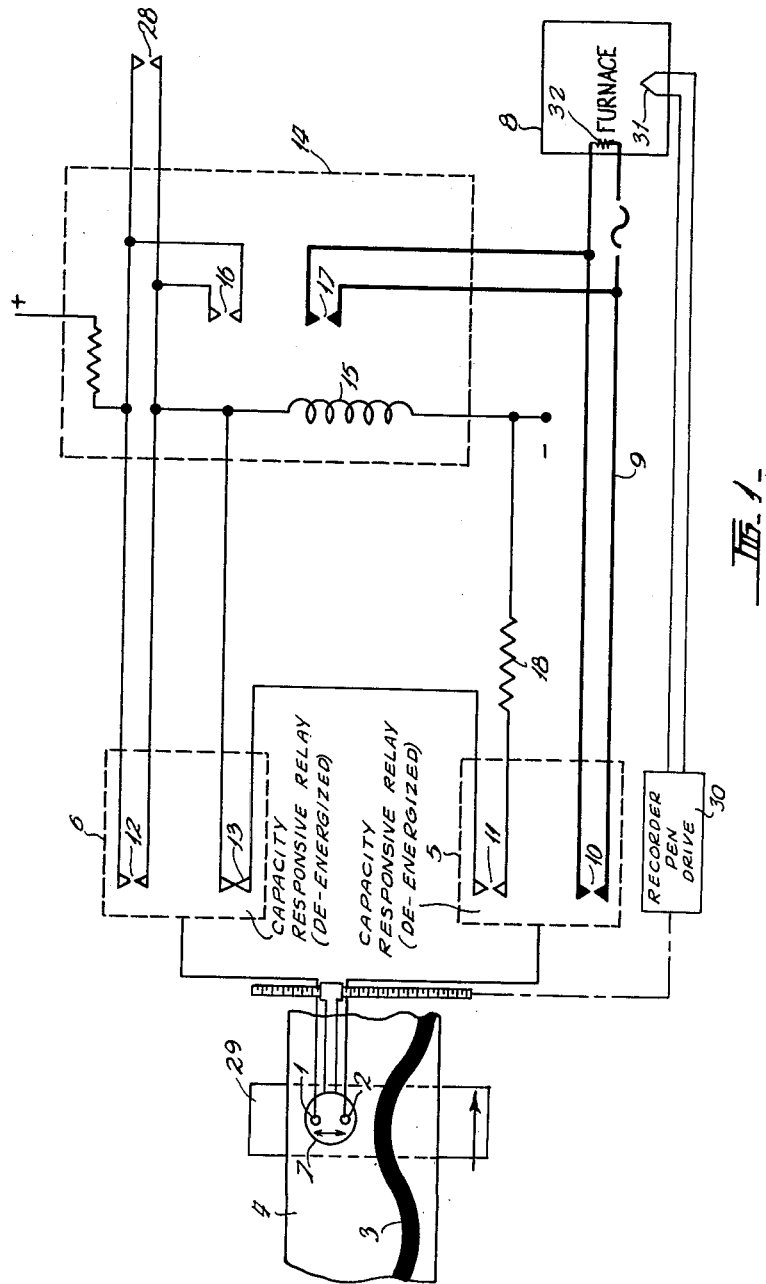
FIGURE 1 illustrates the sensing device and relay system when a double capacity type probe system is employed.
Figure 4:
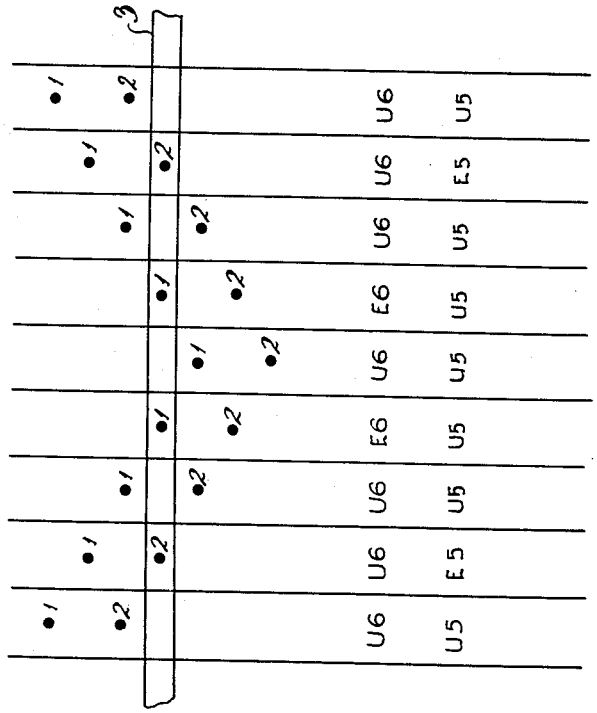
Figure 5:
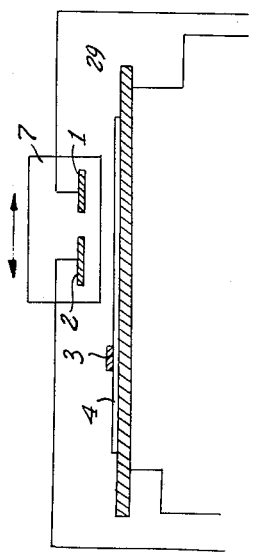
FIG. 5 is a sectional view further illustrating the double capacity type probe system of FIG. 1.

Referring now to FIGURES 1, 3 and 4, a sensing device 7 comprises two probes 1, 2 which pass over the face of a rotating chart 4 which itself passes over or is attached to an electrically conductive plate 29. The capacity between each of the probes 1 and 2 and the conductive plate varies as the sensing device 7 moves over the guide or program line 3. The sensing device or head 7 is moved in opposite directions extending generally transversely to the guide or program line 3 by means of a conventional recorder pen drive mechanism 30, and the operation of the latter is governed by a thermocouple, or other temperature sensitive device 31 located in the furnace 8 so that the position of the sensing head 7 relative to the program line 3 is determined by the relationship of the actual temperature detected in the furnace to the temperature represented by the portion of the program line then adjacent the sensing head. Each capacitance formed by a probe and the conductive plate is connected separately in circuit with one of the relay systems 5, 6. In this embodiment 5 and 6 represent capacity relays of known type, and probe 1 actuating relay 6 and the probe 2 actuating relay 5. The probe 2 is the primary controlling probe, while the probe 1 is a safety or memory probe. In the ideal form of operation only probe 2 would ever touch the line 3.

Assume that probes 1 and 2 are both above the guide line 3 as illustrated in FIGURE 3. In this condition both relays are unenergised and no power passes through the circuit 9 to heat the furnace 8. When the probe 2 hits the line and probe 1 is still above the line the relay 5 becomes energized and relay 6 remains unenergized (mode $U_6E_5$). In FIGURES 3 and 4, $U_6$ represents the condition when relay 6 is unenergized, $U_5$ represents the condition when relay 5 is unenergized, $E_6$ the condition when relay 6 is energized, and $E_5$ the condition when relay 5 is energized. The energizing of relay 5 closes relay contacts 10, 11 and power passes to the heating coil 32 in the furnace. Supposing the sensing device continues to fall through the guide line to a position where both probes are situated on the line, then relay 6 becomes energized closing contact 12 and opening contact 13 (mode $E_6E_5$). In this position current flows through the coil 15 of a further relay 14 closing the contacts 16, 17 and latching the relay 14 which thereafter remains energized independently of the mode of the relay 6. The power carrying contact 17 of relay 14 is now closed as is also the contact 10 of relay 5. If the sensing device falls still further such that probe 2 is below the guide line or even further still such that both probes 1 and 2 fall below the guide line, i.e. the two conditions where relay 6 is energized and relay 5 is unenergized, and both relays 5 and 6 are unenergized, the relay 14 remains latched and the furnace continues to be supplied with power even though contact 10 is open, as the relay contact 17 remains closed. The latching relay 14 is not again released until relay 5 becomes energized and relay 6 again becomes unenergized (mode $U_6E_5$). When this condition obtains the resistance 18 is in parallel circuit relationship with the relay coil 15 and draws current away from the coil 15. The value of the resistance 18 is suitably chosen as to reduce the current in the coil 15 below the minimum sustaining current. This current in the releasing resistor 18 only flows momentarily for as soon as the relay 14 becomes unenergized the coil 15 assumes open circuit. In this mode ($U_6E_5$) current is still supplied to the furnace by virtue of relay 5 being energized and the relay contact 10 closed.

FIGURE 4 illustrates the possible modes when a thin guide line 3 is used. It will be realised that a similar operation of relays takes place in this case although the thinness of the line permit only one probe to be stationed thereon at the one time.

Figure 2:
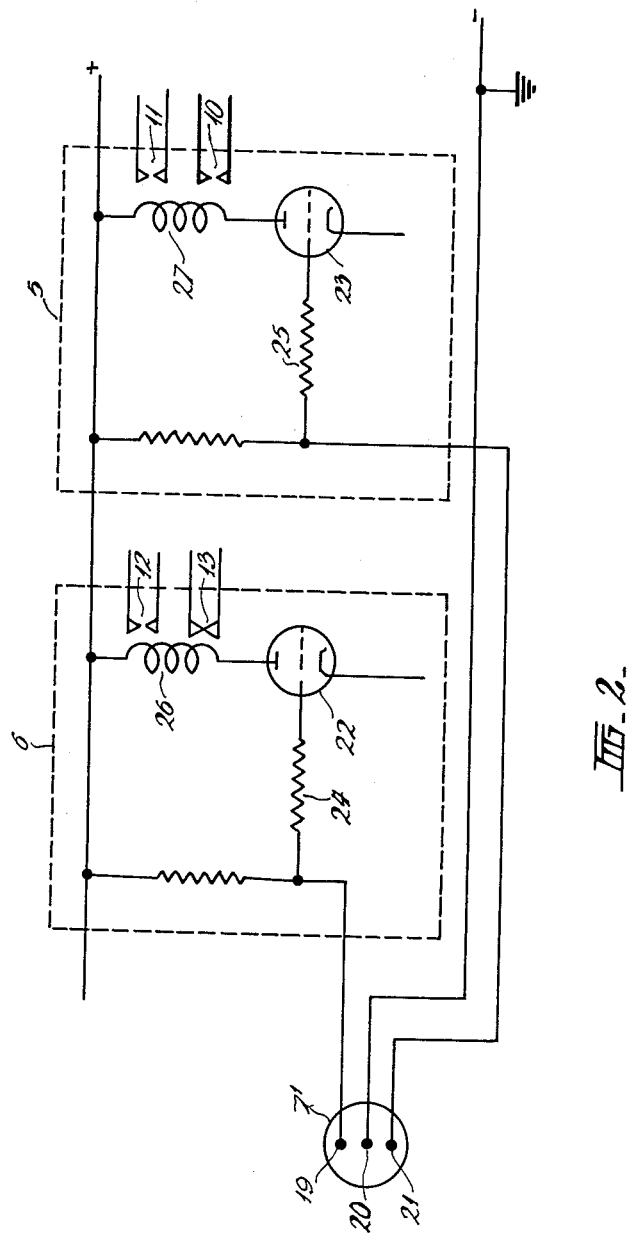
FIGURE 2 illustrates a modified circuit arrangement employed in a three probe conductive type probe system.

From the foregoing description it will be recalled that in the double capacity type probe system the variation in capacity between each probe and a conductive plate underneath the chart served to operate the contact points in separate capacity relays of known type. FIGURE 2 illustrates the manner in which a sensing device comprising three probes may be employed to operate the relays 5 and 6 when employing the double conductivity sensitive probe system. A sensing device $7^1$ comprises three probes 19, 20, 21, the probe 20 being connected to a common ground. The probe 19 is connected through a resistor 24 to the grid of a valve 22 whilst the probe 21 is connected through a resistor 25 to the grid of a valve 23. Relay coil 26 is connected in circuit with the anode of valve 22 while the relay coil 27 is connected in circuit with the anode of valve 23. The relay coil 26 operates the contact points 12 and 13 and the relay coil 27 operates contact points 10 and 11. The closing of the relay contact 10 switches current to the furnace 8 while the closing of the relay contact 12 brings into operation the latching or holding relay 14 to retain the current flowing to the furnace in the manner described with reference to FIGURE 1.

When the probes 20, 21 are both on the guide line a conductive circuit is set up between these probes which brings the valve 23 into operation supplying current to the relay coil 27 to operate the contacts 10 and 11. As the sensing device $7^1$ further passes over the line so that a conductive circuit is set up between probes 19 and 20, the valve 22 is brought into operation and current flows in the relay coil 26 to operate the contacts 12 and 13. The general operation of the relay system in controlling the state of the controlled medium as the sensing device $7^1$ passes from above the guide line, through the guide line to below the guide line is clearly disclosed in the above description of the invention with reference to FIGURES 1, 3 and 4.

Although the description with reference to FIGURE 2 relates to a sensing device comprising three probes, two pairs of probes may equally well be employed. In such a case the center probe 20 would be replaced by two separately grounded probes and the operation of the device would be the same as previously described. It is often desirable to warm up a furnace as quickly as possible until the starting point of the program, which may be at an elevated temperature, is reached. For this purpose, in accordance with one form of the invention, a start-up push button switch 28 is placed in parallel with the latching contacts 16 of relay 14 (FIGURE 1). Momentary contact latches the relay 14 and thus enables full power to be supplied to the furnace until the guide line is reached.

The probes may be of any form of conductive material when made for use with a guide line of carbon, graphite or any material providing a conductive layer on the surface of the chart. However devices in accordance with the invention may equally employ guide lines having magnetic properties and probes in the form of magnetic heads generating electric current to operate the relay coils in dependence on the varying magnetic field as the probe passes over the guide line.

Photo-electric forms of probes may be employed in association with a guide line so constructed as to vary light passing from a light source.

As a further form of construction within the spirit and scope of the invention, the guide line may comprise light-responsive material or radio-active material, the energy omitted therefrom being received by probes in the form of light-sensitive heads or radio-activity sensitive heads respectively.

In addition the probes may be individually pivoted to the sensing device and the guide line may be formed by etching or embossing the surface of the chart. The action of the probes would in these cases be similar to that of a pickup unit in a record player or phonograph and the various forms of pickup associated with a phonograph would be equally applicable to this form of the invention.

While the invention in its practical application has been specifically described in its relation to temperature control of furnaces, it is not to be regarded as so limited as it could equally well be utilised for the regulation of many other variable media.

The above specific embodiment describes an application in which one element of the program is time, but the invention is not to be regarded as so limited. Thus, for example, any variable of which the magnitude can be expressed in terms of a proportional voltage, such as pressure or p.H., could be controlled in accordance with this invention. In such cases the said voltage would be applied to a suitable program chart driving motor.

I claim:

1. A program controller of the curve following type, comprising a chart moving in a predetermined direction and having a line extending generally in said direction thereon with the positions of successive points along said line in said direction of movement of the chart and transversely to said directing of movement representing first and second elements, respectively, of the desired program, a sensing head movable transversely to said direction of movement of the chart and having at least two sensing probes which are spaced apart transversely to said direction of movement of the chart, head displacing means for moving said sensing head transversely to said direction of movement of the chart in response to changes in said second element of the desired program, electrically energizable means for affecting said second element of the program and operative, when energized, to vary said second element in the sense tending to move said sensing head toward one side of said line, and, when deenergized, to cause said one element to vary in the sense tending to move said head toward the other side of said line, an electric circuit connected to said energizable means for energizing the latter, first switch means having two normally open sets of contacts with one of said sets of contacts interposed in said electric energizing circuit, said first switch means being actuated in response to the presence of said line relative to one of said probes to cause closing of said normally open sets of contacts, an auxiliary electric circuit, a relay having a coil interposed in said auxiliary circuit for energizing by the latter and two sets of contacts which are closed only when said coil is energized by a predetermined current flowing therethrough, one of said sets of contacts of the relay being interposed in said energizing electric circuit in parallel with said one set of contacts of the first switch means, the other of said sets of contacts of the relay being connected in series with said coil and constituting hold contacts for the relay, and second switch means having a set of normally open contacts and a set of normally closed contacts, said second switch means being actuated in response to the presence of said line relative to the other of said probes to close said normally open contacts and open said normally closed contacts of said second switch means, said normally open contacts of said second switch means being connected in parallel with said other set of contacts of the relay, and said normally closed contacts of the second switch means being connected in series with the other of said sets of contacts of the first switch means and forming a shunt across said coil of the relay.

2. A program controller of the curve following type, comprising a chart having a line thereon with the positions of successive points along the line in the general direction of the line and transversely to said direction representing two elements, respectively, of the desired program, a sensing head movable transversely to the general direction of the line and comprising a first sensing element and a second sensing element spaced apart in a direction generally transverse to the length of the program line, means controlling the position of said sensing elements in a direction generally transverse to the length of the program line in response to one element of the program, an electrical circuit connected to a source of electrical energy, said circuit when energized affecting said one element of the program, a first switch in said circuit, the condition of said first switch being varied according to the presence and absence of the line relative to said first sensing element to vary said one element of the program to return said first sensing element to the line from a position on one side of the line, a second switch in said circuit in parallel with said first switch, said second switch being operative when neither of said sensing elements is on said one side of the line to vary said one element of the program to return said first sensing element to the line from a position on the other side of the line, a second electric circuit having a relay therein controlling said second switch, with a current sufficient to maintain said second switch closed flowing in said relay when neither of said sensing elements is on said one side of the line, a third switch the condition of which is varied according to the presence or absence of the line relative to said first sensing element, and a fourth switch the condition of which is varied according to the presence or absence of the line relative to said second sensing element, said third and fourth switches being arranged to reduce the current in said relay below that required to maintain said second switch closed when the line is present relative to said first sensing element and absent relative to said second sensing element.

3. A program controller of the curve following type as in claim 2; wherein said third switch is open unless the line is present relative to said first sensing element and said fourth switch is closed unless the line is present relative to said second sensing element, said third and fourth switches being arranged in series with each other and in parallel with said relay.

4. A program controller of the curve following type as in claim 2; wherein the response of said sensing elements depends on the difference in electrical conductivity between said chart and said line thereon.

5. A program controller of the curve following type as in claim 2; wherein said sensing elements comprise a pair of probes each of which forms a plate of a pair of capacitors, the dielectric of each of said capacitors being varied according to the presence or absence of the line in relation to the respective probe.

References Cited in the file of this patent

UNITED STATES PATENTS

| | | |
|---|---|---|
| 2,445,041 | Scholz | July 13, 1948 |
| 2,503,052 | Keinath | Apr. 4, 1950 |
| 2,611,115 | Johnston | Sept. 16, 1952 |
| 2,851,643 | Limberger | Sept. 9, 1958 |

FOREIGN PATENTS

| | | |
|---|---|---|
| 571,983 | Great Britain | Sept. 18, 1945 |